US005601117A

United States Patent [19]
Lewis et al.

[11] Patent Number: 5,601,117
[45] Date of Patent: Feb. 11, 1997

[54] FLAP-TYPE PRESSURE RELIEF VALVE

[75] Inventors: Jeffrey C. Lewis, Rochester Hills; James F. Fleck, Warren, both of Mich.

[73] Assignee: TRW Inc., Cleveland, Ohio

[21] Appl. No.: 393,130

[22] Filed: Feb. 21, 1995

[51] Int. Cl.⁶ .................. F16K 15/14; B60H 1/26
[52] U.S. Cl. ................... 137/855; 137/527.8; 454/162
[58] Field of Search .................. 137/527.8, 855, 137/856, 857, 858; 454/162, 164, 165

[56] References Cited

U.S. PATENT DOCUMENTS

| | | | |
|---|---|---|---|
| 3,057,373 | 10/1962 | Bragg . | |
| 3,292,658 | 12/1966 | Scaramucci | 137/856 |
| 3,938,548 | 2/1976 | Hope | 137/527.8 |
| 3,998,571 | 12/1976 | Falke . | |
| 4,230,149 | 10/1980 | Worthen et al. . | |
| 4,266,569 | 5/1981 | Wilson | 137/527.8 |
| 4,946,451 | 8/1990 | Cianci . | |
| 4,955,797 | 9/1990 | Cowen . | |
| 5,105,731 | 4/1992 | Kraus | 454/162 |
| 5,167,574 | 12/1992 | Ikeda et al. | 454/164 |
| 5,192,200 | 3/1993 | Lilie et al. . | |
| 5,228,468 | 7/1993 | Kapadia . | |
| 5,263,895 | 11/1993 | Kraus et al. . | |
| 5,355,910 | 10/1994 | Gies et al. . | |
| 5,492,505 | 2/1996 | Bell et al. | 454/162 |

FOREIGN PATENT DOCUMENTS

91/73797   10/1991   Australia ................. 137/855

*Primary Examiner*—James Larson
*Attorney, Agent, or Firm*—Fay, Sharpe, Beall, Fagan, Minnich & McKee

[57] ABSTRACT

A flap-type pressure relief valve includes a frame defining a flow opening therethrough with a flexible flap valve element positioned adjacent the frame to overlie the opening and allow fluid flow in a first direction through the opening while preventing flow in the opposite direction. A retainer assembly for joining a peripheral edge portion of the flap valve element to the frame comprises an elongated retainer bar integrally joined to the frame at one edge and connected to the frame at the other edge along a side of the flow opening in overlying relationship to a peripheral edge of the flap valve element. The retainer bar has a retainer surface spaced from the frame a distance slightly greater than the thickness of the flap valve element. Retainer pins extend from the frame through openings in the flap valve element. The assembly thus supports the flap valve element in a freely floating manner without forming air leakage openings.

12 Claims, 2 Drawing Sheets

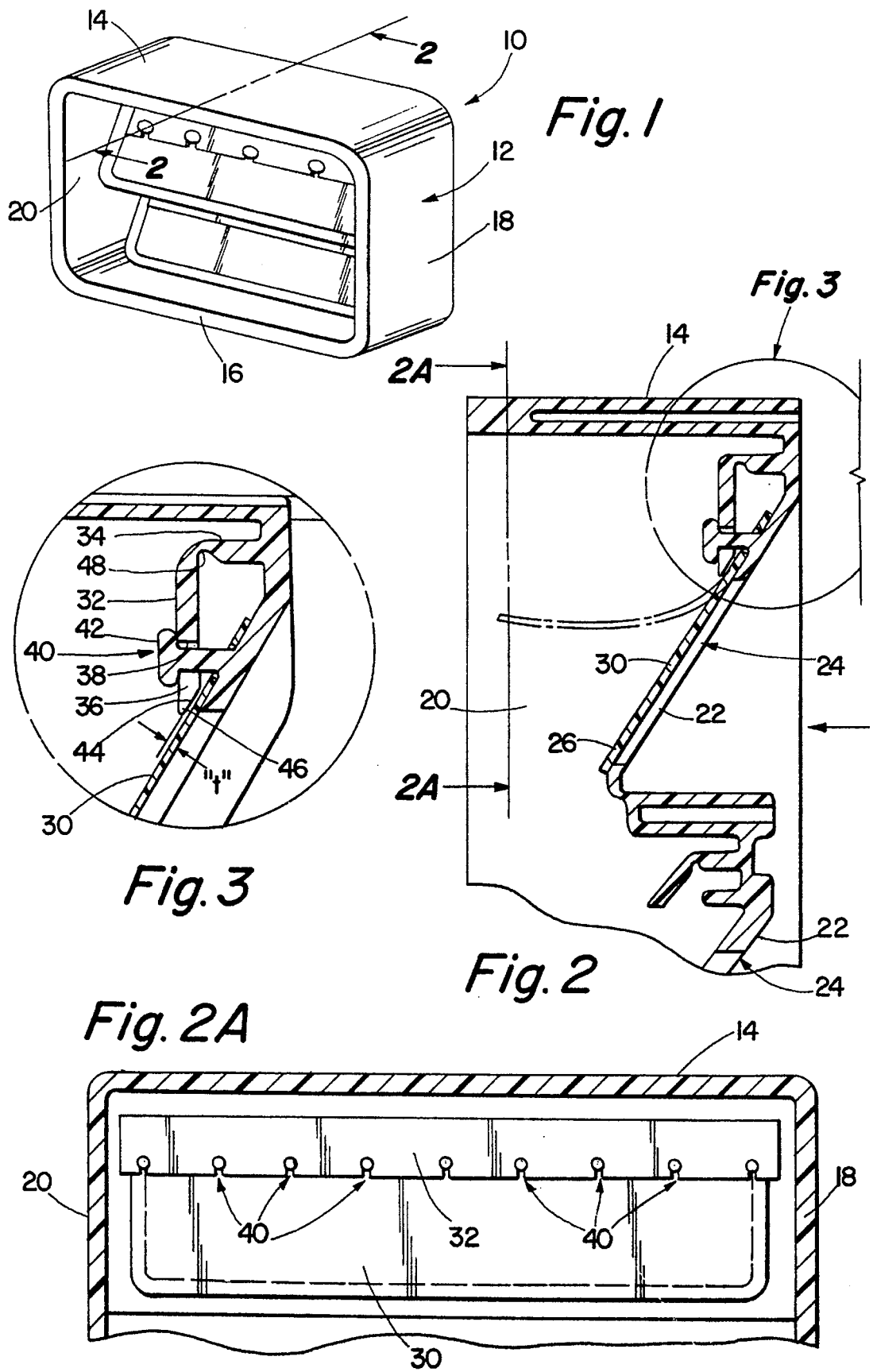

FLAP-TYPE PRESSURE RELIEF VALVE

BACKGROUND OF THE INVENTION

The subject invention is directed toward the valve art and, more particularly, to a flap-type pressure relief or check valve.

Flap-type valves of the type under consideration are commonly used to relieve over-pressure conditions in vehicle compartments and the invention will be described with reference thereto; however, the invention is capable of broader application and could be used in many environments.

One-way, flap-type pressure relief valves are commonly used in vehicle ventilation systems. Typically, they act to relieve over-pressure conditions and allow a controlled flow of air through the passenger compartment. Valves used for this purpose generally comprise a frame which defines a flow passage and one or more internal valve seats. The valve elements comprise flexible flaps that are joined to the frame along one peripheral edge and overlie the seat or seats. When over-pressure conditions occur on one side, the flaps move away from the seats and allow flow through the frame. Upon upstream and downstream balanced pressure or downstream over-pressure, the flaps engage the seats and block reverse flow.

Typical valves of the type under consideration are illustrated in U.S. patents to Ikeda, et al. U.S. Pat. No. 5,167,574; Garries, et al. U.S. Pat. No. 4,899,647; Hagenah U.S. Pat. No. 4,667,578; Kraus, et al. U.S. Pat. No. 5,263,895; and Clough U.S. Pat. No. 5,105,845. In the valves shown in these prior patents, a variety of different systems are used to join the valve flaps to the frame. These systems vary from inserted tabs to bolts, rivets, and heat welded plastic pins and plates. In each case, however, the time required to install the flaps is somewhat excessive. In addition, and more importantly, the flap elements often do not "float" properly relative to the seat opening because of the nature of the resulting clamped connection. Further, many of the prior connections have unsealed connector openings through the frame which result in undesired air infiltration.

As can be seen from the foregoing, a need exists for a more satisfactory system and arrangement for joining the valve flap elements in their mounted position on the frame.

SUMMARY OF THE INVENTION

In accordance with the subject invention, there is provided a flap-type pressure relief valve that includes a frame defining a flow passage and a valve flap positioned to overlie the flow passage and control flow therethrough. An improved retainer assembly is provided for joining the flap to the frame. The retainer assembly includes a plurality of retainer pins, or posts, that extend adjacent the fluid passage opening. A retainer bar is integrally formed with the frame along one edge of the bar and is retained to the frame along a second edge of the bar by the retainer pins and has portions overlying a peripheral edge of the flap element adjacent the flow passage opening. The retainer pins extend from the frame through openings in the peripheral edge of the valve flap and join with the retainer bar.

Preferably, and in accordance with a more limited aspect of the invention, the retainer bar is spaced from the frame a distance slightly greater than the thickness of the valve flap at the second end and the retainer pins extending from the frame through the openings in the peripheral edge of the flap element are smaller in diameter than the openings in the flap valve element. Thus, the flap valve element is retained by the pins in a free floating manner and is not tightly clamped by the retainer bar.

In accordance with another aspect of the invention, the retainer bar is an integral, elongated rigid member and extends adjacent the flow passage. The retainer pins are resilient and extend through openings in the retainer bar to hold it in position on the frame.

As can be seen from the foregoing, this arrangement allows an integrally formed retainer bar to hold the flap valve in position. Securing the flap valve in place can be accomplished merely through a single step mechanical pushing operation which locates the retainer bar over the retainer pins and also cold stakes a cap to secure the bar to the pins. When the bar is properly located on the retainer pins, the retainer pins extend into their desired located position in the bar through openings in the flap valves. As a result, the flap valve element is properly supported adjacent the flow opening in a floating or freely suspended manner so that it can quickly respond to pressure changes thereacross. The retainer assembly thus does not adversely effect the functioning of the flap valve element. Additionally, convenient positioning of the retainer bar is greatly facilitated and the relationship between the retainer bar, the retainer pins in the frame, and the flap valve element is such that proper assembly is assured and the relationship between the components is maintained properly at all times.

A primary object of the invention is the provision of a flap valve mounting arrangement which assures that the flap valve is properly joined to the frame in a floating relationship and without air leakage paths resulting from the mounting.

Another object is the provision of a flap mounting assembly which is simple to assemble and requires only a single manufacturing step which essentially comprises a pushing operation with no special fasteners associated therewith.

Another object is the provision of a valve of the type described wherein a single molded component can form both the frame and the flap mounting elements.

A still further object is the provision of a mounting assembly of the general type described which assures positive fastening and improves resulting operating relationship between the mounted parts.

Yet another object is the provision of a simplified flap valve mounting arrangement which permits removal and replacement of the flap valve element simply and without the use of special tools.

Yet another object is the provision of a retainer assembly integrally formed with the frame to reduce the number of components and simplify the process of securing the flap valve element.

BRIEF DESCRIPTION OF THE DRAWINGS

The above and other objects and advantages will become apparent from the following description when read in conjunction with the accompanying drawings wherein:

FIG. 1 is a perspective view of a flap valve over-pressure relief valve assembly incorporating the present invention;

FIG. 2 is an enlarged cross-sectional view taken on line 2—2 of FIG. 1;

FIG. 2A is a cross-sectional view taken on line 2A—2A of FIG. 2;

FIG. 3 is a greatly enlarged view of the circled portion of FIG. 2; and,

DETAILED DESCRIPTION OF THE PREFERRED EMBODIMENT

Figure 4A:
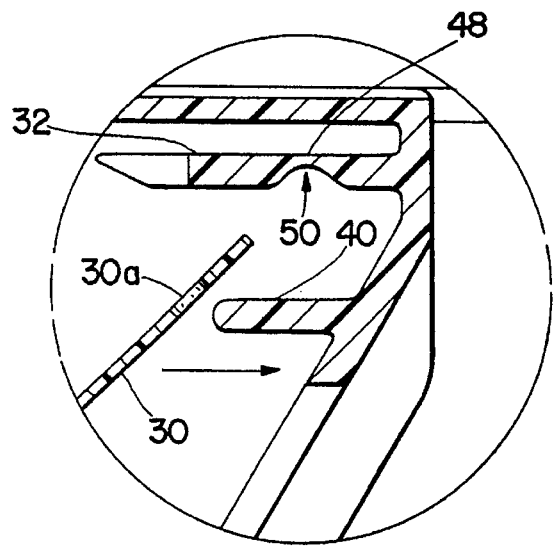
FIGS. 4A–C are enlarged views of the circled portions of FIG. 2 illustrating steps comprising the process of securing the retainer assembly of FIGS. 2–3.

Referring more particularly to the drawings wherein the showings are for the purpose of illustrating a preferred embodiment of the invention only and not for the purpose of limiting same, FIGS. 1, 2, and 2A show the general overall arrangement of a flap type pressure relief valve assembly 10 formed in accordance with the subject invention. The assembly 10 generally includes a rectangular frame 12 which could have a variety of specific configurations and constructions but is illustrated as having a generally flat upper wall 14, a lower or bottom wall 16, and side walls 18 and 20. The frame could be formed in a variety of manners but, in the preferred embodiment, is a plastic injection molded structure of unitary design and includes one or more of internal sub-frame assemblies or members 22 that are positioned to lie at an angle, as shown, and define through flow openings 24. In the subject embodiment, there are two of the sub-frame assemblies 22, each having a transversely elongated and inclined flow opening 24. It should, of course, be appreciated that the total number of internal sub-frames 22 as well as the number of flow passages could be varied.

The sub-frames 22 are preferably integrally formed with the main exterior frame 12 and lie at the angle shown with a planar valve seat defining surface 26 formed thereby. Overlying each of the flow passages 22 for engaging the seat surface 26 is a flexible valve flap element 30. Each valve flap is sized so as to completely overlie the associated opening 24 and engage peripherally about the opening on the associated sub-frame frame 22. FIGS. 1 and 2 illustrate the flap valves in a closed position. However, when an over-pressure condition exists on the right or upstream side of the flap valves 30, they can move away from the associated seat surface to an open position such as illustrated in dotted lines in FIG. 2. Flow can thus take place freely from the upstream to the downstream side of the valve. Should the pressures on the upstream and downstream sides balance or should a downstream over-pressure condition result, the valve immediately returns to the closed position under the force of gravity or because of the increased downstream pressure.

As previously discussed, a variety of different connecting techniques and structures have been used for joining the upper peripheral edge of the flap valve elements to the associated frame structure. Most of these prior methods and arrangements have resulted in air leakage openings or have been somewhat complicated to use. In addition, often they have not supported the flap valve elements in the most efficient and effective manner to allow them to freely move in the intended manner and to fully seal completely about their periphery in the closed position.

The subject invention, however, presents a greatly improved connecting arrangement which can best be seen and understood by reference to FIGS. 2 and 3. Basically, the subject arrangement makes use of a retainer bar 32 that is arranged to extend transversely of the frame 12 in overlying relationship at one end to the upper peripheral edge of the associated flap valve element 30. Desirably and in accordance with the preferred embodiment of the subject invention, the retainer bar 32 is a plastic bar member of relatively rigid construction integrally molded with the frame 12 and extending transversely the full width of the frame. It should, of course, be understood that, as well become apparent, this member could be subdivided into a plurality of shorter members if desired.

Preferably, the retainer bar 32 connects to the frame 12 at a first edge 34 which is molded integrally with the frame and extends completely across the frame between side walls 18 and 20 and is generally parallel to the upper wall 14. A locking connection between the frame and the retainer bar 32 is provided by a second edge 36 having a slot-like orifice 38 in conjunction with retainer pin 40. The second edge 36, when locked in place, is generally perpendicular to the upper wall 14 along its length. Each of the retainer pins 40 are shown as having spaced locking caps 42 extending therefrom. Each retainer bar is provided with the mounting orifices 38 located to correspond to the location and spacing of the associated retaining pins 40. This allows the retainer bars to be moved into their mounted positions shown by a simple pushing operation parallel with the side walls of the main frame 10 and secured, as will be more particularly described with reference to FIGS. 4A–C.

The second, or lower, edge 36 of each retainer bar 32 is tapered and inclined as shown at 44 so as to generally correspond to the incline of the associated valve seat portion 26 of the sub-frame 22. Surface 44 of retainer bar 32 is located to overlie both the upper peripheral seat area of sub-frame 22 and the peripheral edge portion of the flap element 30. Additionally, according to a preferred aspect of the invention, the spacing "t" (shown in FIG. 3) of the bar surface 44 relative to the seat surface 26 should be slightly greater than the thickness of the associated flap element 30. This is desired so that the surface 44 does not clampingly engage the flap valve element 30 when the clamp bar is in its installed and located position shown. In addition, it is preferable that the lower end corner of the retainer bar 32 have a gentle rounded configuration as shown at 46. This allows free movement of the flap to the open position shown dotted in FIG. 2.

As shown in FIGS. 2 and 3, the retainer bar 32 further includes a reduced thickness portion 48. The portion 48 acts as a living hinge 50 and pivotally joins the bar 32 to frame 12 to allow the first end 34 to remain relatively horizontal and parallel to the top surface 14 when the second end 36 is pivoted into position relative to retaining pin 40, as will be hereafter described.

Figure 4B:
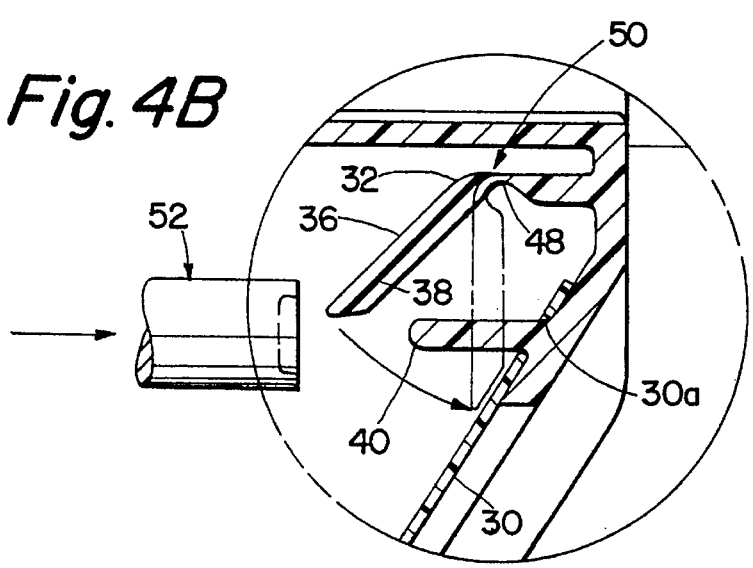
Figure 4C:
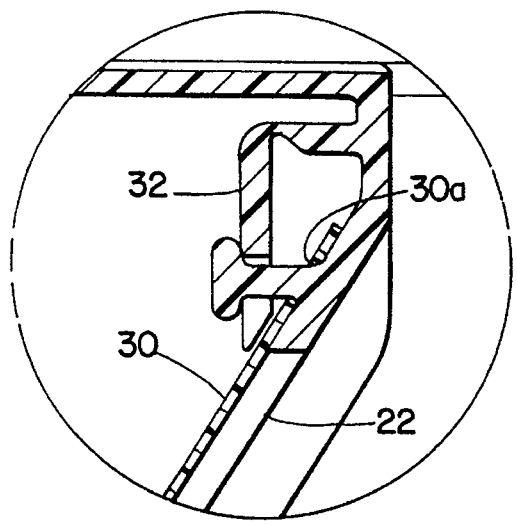

Referring now to FIGS. 4A–C, as previously mentioned, the retainer bar 32 is integrally molded with frame 12 in an extended position as generally shown in FIG. 4A. During assembly, the flap valve element 30 is positioned on retaining pins 40 so that the retaining pins are received into the corresponding apertures 30a along the top edge of element 30 in the direction of the arrow (FIG. 4A). Second, the second end 36 of retainer bar 32 is bent, via hinge 50, to assume the desired position (shown in dotted lines in FIG. 4B) relative to the retaining pin 40 so that the slot-like orifice 38 of the bar 32 engages about the pin 40 (FIG. 4B). Many types of fasteners or even snap connections could be used to retain the retaining bar 32 in the desired position relative to pins 40. In the subject embodiment, however, a cold staking process, implemented with assembly tool 52, is preferably undertaken to form a locking cap 42 on one or more pins 40 (FIG. 4B). As a result, the retaining bar 32 is locked into place so that the flap valve element 30 is secured between the retainer bar 32 and the subframe assembly 22 (FIG. 4C).

In the arrangement described, clamping or mounting of the flap valve elements 30 to the frame is accomplished with no openings through the frame where air infiltration can take place. Thus, the only openings through the frame are the flow passages 24 which are controlled by the associated flap valves 30.

The arrangement is both simple in construction and allows for rapid simple installation of the flap valve elements into the frame. The arrangement is such that the fastening element, i.e., the retaining bar, is integral with the frame thus facilitating and simplifying locking the retainer bar on retainer pins 40 to secure the flap valve element.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a flap-type pressure relief valve including a frame defining a flow passage and a flap valve element positioned to overlie the flow passage, the improvement comprising:

retainer pins extending from the frame through openings in a peripheral edge of the flap valve element; and, a retainer bar pivotally joined with the frame at a first edge and cooperating with the retaining pins at a second edge to overlie a peripheral edge of the flap valve element and retain the valve flap element on the retainer pins.

2. The flap-type pressure relief valve as defined in claim 1 wherein the retaining bar is located to maintain the second edge of the retainer bar spaced from the flap valve element and wherein the retainer pins pass freely through said openings in the flap valve element to allow retention of the flap valve element to the frame without clamping of the periphery thereof.

3. The flap-type pressure relief valve as defined in claim 1 wherein the retainer bar comprises a single element.

4. The flap-type pressure relief valve as defined in claim 3 wherein the retainer bar is connected to the frame by said retainer pins extending from the frame through retention orifices in the second edge of the retainer bar.

5. The flap-type pressure relief valve as defined in claim 3 wherein the retainer pins are formed integrally with the frame and wherein the frame is molded from a plastic material.

6. In a flap-type pressure relief valve including a frame defining a flow opening therethrough and a flexible flap valve element having a thickness and a peripheral edge, said flap valve element positioned adjacent the frame to overlie the opening and allow fluid flow in a first direction through the opening while preventing flow in the opposite direction, the improvement comprising:

at least one elongated retainer bar pivotally joined to the frame at a first edge and connecting to the frame at a second edge along a side of the flow opening, the at least one retainer bar overlying the peripheral edge of the flap valve element and having a retainer surface spaced from the frame a distance greater than the thickness of the flap valve element to overlie the flap valve element in a non-clamping relationship with the frame.

7. The flap-type pressure relief valve as defined in claim 6 including retainer pins extending through openings in the flap valve element and means for locking the retainer bar in position relative to the retainer pins.

8. In a flap-type pressure relief valve including a frame defining a flow opening therethrough and a flexible flap valve element positioned adjacent the frame to overlie the opening and allow fluid flow in a first direction through the opening while preventing flow in the opposite direction, the improvement comprising at least one elongated retainer bar having a first edge integrally joined and pivotal with respect to the frame and a second edge connected to the frame by retainer pins extending from one of the frame and the retainer bar.

9. The flap-type pressure relief valve as defined in claim 8 including means for locking the retainer bar in position relative to the retainer pins.

10. The flap-type pressure relief valve as defined in claim 8 wherein the frame and the retainer bar are molded from a plastic material.

11. The flap-type pressure relief valve as defined in claim 10 wherein the retainer bar is molded with a reduced thickness portion that acts as a hinge to allow the retainer bar to move pivotally.

12. In a flap-type pressure relief valve including a frame defining a flow opening therethrough and a flexible flap valve element positioned adjacent the frame to overlie the opening and allow fluid flow in a first direction through the opening while preventing flow in the opposite direction, the improvement comprising at least one elongated retainer bar having a first edge integrally joined and pivotal with respect to the frame, and retainer pins formed integrally with the frame, the retainer pins passing through openings in a peripheral edge portion of the flap valve element and engaging a second edge of the retainer bar to lock the retainer bar in position to join the peripheral edge portion of the flap valve element to the frame.

\* \* \* \* \*